(12) United States Patent
Seki et al.

(10) Patent No.: US 6,509,970 B1
(45) Date of Patent: Jan. 21, 2003

(54) WAVELENGTH MONITORING APPARATUS FOR LASER LIGHT FOR SEMICONDUCTOR EXPOSURE

(75) Inventors: Kyohei Seki, Gotenba (JP); Kazuaki Hotta, Gotenba (JP); Takao Kobayashi, Fukui (JP)

(73) Assignee: Ushio Denki Kabushiki Kaisya, Tokyo (JP)

( * ) Notice: Subject to any disclaimer, the term of this patent is extended or adjusted under 35 U.S.C. 154(b) by 263 days.

(21) Appl. No.: 09/599,289

(22) Filed: Jun. 21, 2000

(30) Foreign Application Priority Data

Jun. 23, 1999 (JP) .......................... 11-176903

(51) Int. Cl.$^7$ ................................. G01B 9/02
(52) U.S. Cl. ...................... 356/454; 356/519
(58) Field of Search ................. 556/454, 519; 372/32

(56) References Cited

U.S. PATENT DOCUMENTS

| | | |
|---|---|---|
| 4,319,843 A | 3/1982 | Gornall |
| 5,319,441 A * | 6/1994 | Terada et al. ............... 356/454 |
| 5,748,316 A | 5/1998 | Wakabayashi et al. |

FOREIGN PATENT DOCUMENTS

JP 2-271689 11/1990

* cited by examiner

Primary Examiner—Samuel A. Turner
Assistant Examiner—Patrick Connolly
(74) Attorney, Agent, or Firm—Dellett & Walters

(57) ABSTRACT

The present invention relates to a wavelength monitoring apparatus capable of measuring both standard light and laser light for semiconductor exposure simultaneously and highly accurately, without a time lag. Entrance-side optical systems $2_1$ and $2_2$ allow light from a laser 20 for semiconductor exposure and reference light from a He—Ne laser 10 to be incident on different areas of a single etalon 1 in the form of diverging light, converging light or diffused light in such a manner that the respective center axes thereof are displaced relative to each other. Two focusing optical systems $3_1$ and $3_2$ are provided in approximately coaxial relation to the respective center axes of the laser light and reference light passing through the etalon 1. A one-dimensional array optical sensor 4 is placed in a plane P coincident with the back focal planes of the focusing optical systems $3_1$ and $3_2$ to receive interference fringes produced by the laser light and the reference light. The positions of the interference fringes on the one-dimensional array optical sensor 4 are detected to calculate the wavelength of the laser light for semiconductor exposure.

5 Claims, 4 Drawing Sheets

WAVELENGTH MONITORING APPARATUS FOR LASER LIGHT FOR SEMICONDUCTOR EXPOSURE

BACKGROUND OF THE INVENTION

The present invention relates to a wavelength monitoring apparatus for laser light for semiconductor exposure. More particularly, the present invention relates to a wavelength monitoring apparatus for laser light for semiconductor exposure that measures the wavelength of laser light for semiconductor exposure relative to reference light, whose wavelength is known, simultaneously with the measurement of the reference light.

With the achievement of small and fine semiconductor integrated circuits, the wavelength of semiconductor exposure light is becoming shorter. Accordingly, ArF excimer laser of wavelength 193.4 nm or fluorine laser of wavelength 157 nm is promising as a next-generation light source for semiconductor lithography. Regarding ArF excimer laser, its spectral line width is generally wide, i.e. of the order of 400 pm. However, as optical materials usable for exposure apparatus in the vacuum ultraviolet region, there are only synthetic quartz and fluorite, and it is extremely difficult to achromatize the projection optical system of the exposure apparatus. To avoid the problem of chromatic aberration in the projection optical system of the exposure apparatus, it is necessary to narrow down the spectral line width to 1 pm or less, and it is essential to stabilize the wavelength so that variations in the center wavelength are within ±0.1 pm.

Fluorine laser also needs to narrow the spectral line width when it is used in an exposure apparatus having a projection optical system.

Narrowing of the spectral line width is realized, for example, by a spectral width-narrowing optical system including a beam diameter-enlarging prism and a diffraction grating. Wavelength selection is performed by controlling the angle of incidence of light on the diffraction grating.

Realization of the above-described wavelength stabilization requires a wavelength monitoring apparatus for measuring the wavelength and spectral line width of the narrowed laser light for semiconductor exposure during exposure and for feedback-controlling the laser on the basis of data obtained by the measurement.

FIG. 4 shows the arrangement of a wavelength monitoring apparatus available from Burleigh Instruments, Inc. as a conventional wavelength monitoring apparatus of the type described above. In this apparatus, reference light from a He—Ne laser of wavelength 632.8 nm used as a standard light source is incident on a beam splitter via a reflecting mirror and a shutter A. The reference light is reflected by the beam splitter to reach an etalon via a reflecting mirror and a concave mirror. In the etalon, the reference light is subjected to multiple beam interference and then passes through a focusing lens to form interference fringes of concentric circles or parallel lines on the back focal plane of the focusing lens. A linear array sensor (CCD), which is placed in the back focal plane, corrects variations in the refractive index of air in the etalon and variations in the mirror spacing on the basis of data concerning the position of each fringe on the CCD. Next, the shutter A is closed, and light under wavelength measurement from, for example, an ArF excimer laser, for semiconductor exposure, which has a wavelength in the vicinity of 193.4 nm is input through an entrance aperture and a shutter B from the right-hand side as viewed in the figure. The laser light passes through the beam splitter to reach the etalon via the reflecting mirror and the concave mirror. The laser light is subjected to multiple beam interference in the etalon and passes through the focusing lens to form interference fringes of concentric circles or parallel lines on the CCD placed in the back focal plane of the focusing lens. The wavelength of the light under measurement is calculated from data concerning the positions on the CCD of the fringes of the light under measurement.

In the conventional wavelength monitoring apparatus, the fringes produced by the standard light source (He—Ne laser) and the fringes by the excimer laser for semiconductor exposure are formed in the same area on the CCD. If it is intended to observe these fringes simultaneously (both the shutters A and B are opened to allow the reference light and the light under wavelength measurement to enter the system), the fringes of the two light beams undesirably overlap each other on the linear array sensor. Accordingly, it becomes difficult to measure the positions of the fringes accurately. For this reason, each fringe pattern has to be measured individually in the conventional apparatus. Consequently, there is an interval of time between the calibration of the etalon using the fringes produced by the standard light source (i.e. the measurement of the fringe positions) and the wavelength measurement using the fringes of the excimer laser for semiconductor exposure (i.e. the measurement of the fringe positions). Accordingly, there is a possibility that an error will occur in the measurement.

In the wavelength monitoring apparatus shown in FIG. 4, a He—Ne laser of high frequency stability, for example, is used as a standard light source. Because such a laser needs an unfavorably long time to become stabilized from start-up, it is necessary to make the laser oscillate continuously from the start-up to the completion of measurement. Therefore, it is necessary to provide a shutter mechanism (shutter A) for blocking light between the He—Ne laser and the etalon so that the fringes produced by the He—Ne laser are not formed on the CCD during the wavelength measurement of the excimer laser for semiconductor exposure. As the repetition frequency of the excimer laser increases, it becomes impossible for the open-close operation of the shutter A to follow up the repetition frequency if it is intended to perform wavelength measurement for each shot of the excimer laser.

Regarding the etalon coating, He—Ne laser light and excimer laser light for semiconductor exposure pass through a single etalon. Therefore, reflecting mirrors that constitute the etalon require a dielectric multilayer coating for two wavelengths: the wavelength of He—Ne laser light, i.e. 632.8 nm, and the wavelength of ArF excimer laser light, i.e. about 193 nm. It is difficult and costs a great deal to make a coating that provides satisfactory reflectance and low-loss characteristics for both the wavelengths.

These problems are associated with not only the ArF excimer laser but also the fluorine laser.

SUMMARY OF THE INVENTION

In view of the above-described problems with the prior art, an object of the present invention is to provide a wavelength monitoring apparatus which is capable of measuring both standard light and laser light for semiconductor exposure simultaneously and highly accurately, without a time lag, and which does not require a shutter mechanism for switching between the standard light and the laser light for semiconductor exposure but only needs to provide an etalon with coatings exhibiting satisfactory reflectance and low-loss characteristics for the standard light and the laser light for semiconductor exposure, respectively.

To attain the above-described object, the present invention provides a wavelength monitoring apparatus for laser light for semiconductor exposure. The wavelength monitoring apparatus includes an entrance-side optical system for making the laser light for semiconductor exposure and reference light incident on different areas of a single etalon in the form of diverging light, converging light or diffused light in such a manner that the respective center axes of the laser light and the reference light are displaced relative to each other. Two focusing optical systems are provided in approximately coaxial relation to the respective center axes of the laser light and reference light passing through the etalon. A one-dimensional array optical sensor is placed in a plane coincident with the back focal planes of the focusing optical systems to receive interference fringes produced by the laser light and the reference light. The positions of the interference fringes on the one-dimensional array optical sensor are detected to calculate the wavelength of the laser light for semiconductor exposure.

In this case, it is desirable that the one-dimensional array optical sensor be a single one-dimensional array optical sensor, and that the interference fringes produced by the laser light for semiconductor exposure and the interference fringes by the reference light be incident on respective split areas of the one-dimensional array optical sensor without being superimposed on one another.

It is desirable that the etalon have different reflective coatings applied to an area thereof on which the laser light for semiconductor exposure is incident and an area thereof on which the reference light is incident, respectively.

The wavelength monitoring apparatus for laser light for semiconductor exposure is particularly effective when the laser light for semiconductor exposure is ArF excimer laser light or fluorine laser light and the reference light is He—Ne laser light.

In the present invention, laser light for semiconductor exposure and reference light are made incident on different areas of a single etalon in such a manner that the respective center axes of the laser light and the reference light are displaced relative to each other. The laser light and reference light passing through the etalon are passed through two focusing optical systems, respectively, to produce interference fringes on a one-dimensional array optical sensor. Accordingly, it is possible to measure the wavelength of the light under measurement with high accuracy on the basis of the wavelength of the reference light simultaneously with the measurement of the reference light. Thus, it is possible to eliminate the influence of a measurement error otherwise introduced owing to a time lag between the measurement of the reference light and the measurement of the light under wavelength measurement. In addition, it is only necessary to divide each coating area of a single etalon into two regions and to apply a coating for the reference light to one region and a coating for the light under wavelength measurement to the other region. Accordingly, it becomes easy to apply reflective coatings to the etalon.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

An embodiment of the wavelength monitoring apparatus for laser light for semiconductor exposure according to the present invention will be described below.

Figure 1:
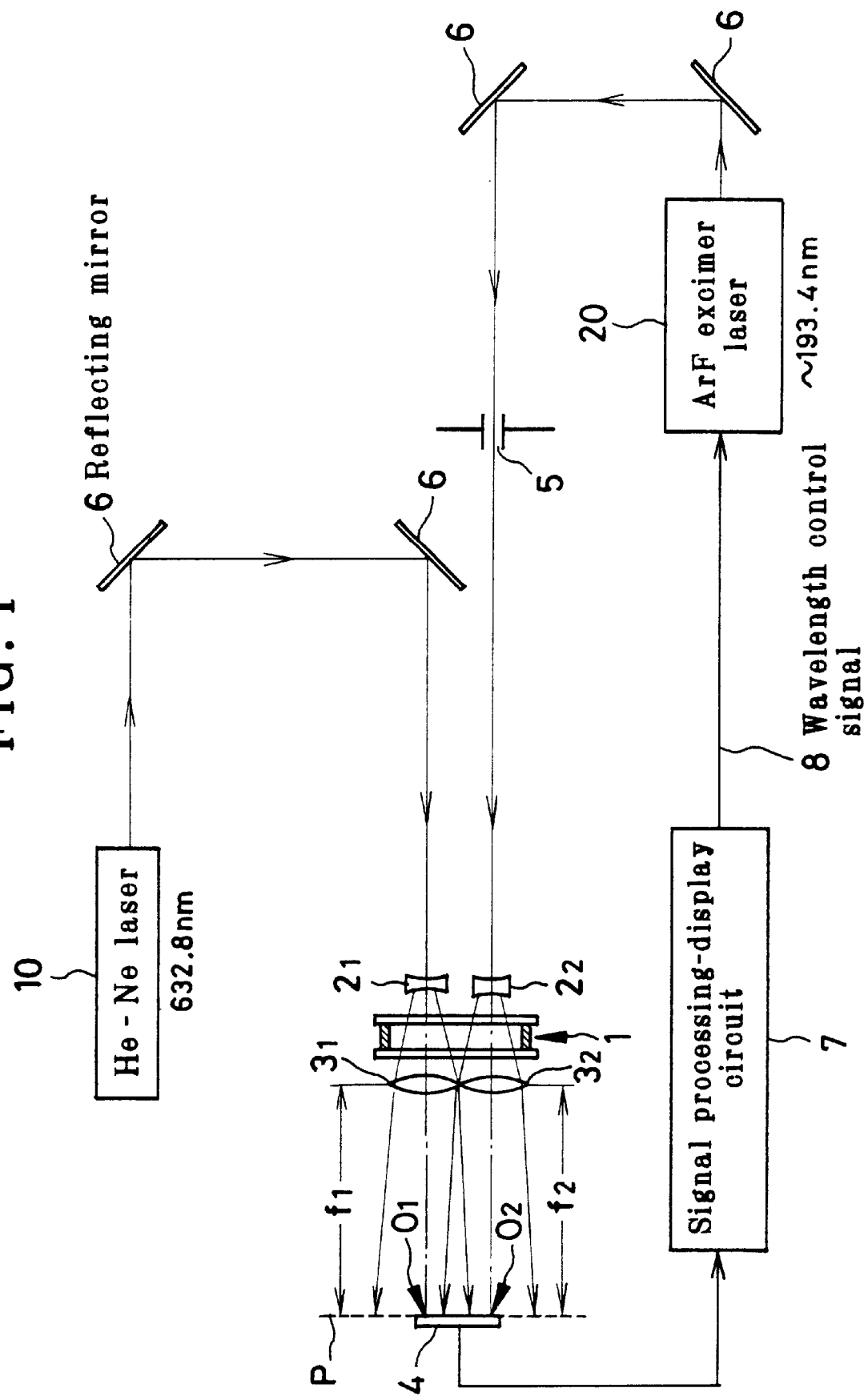
FIG. 1 is a diagram showing the arrangement of a wavelength monitoring apparatus for laser light for semiconductor exposure according to an embodiment of the present invention.

FIG. 1 is a ray path diagram showing a wavelength monitoring apparatus according to one embodiment of the present invention. The wavelength monitoring apparatus has a single etalon 1. On the entrance side of the etalon 1, two concave lenses $2_1$ and $2_2$ are placed in side-by-side relation to each other. On the concave lens $2_1$, reference light from a He—Ne laser 10 as a reference light source is made incident through reflecting mirrors 6. On the other concave lens $2_2$, light under wavelength measurement from, for example, an ArF excimer laser 20, for semiconductor exposure, is made incident through reflecting mirrors 6 and an entrance aperture 5. The reference light converted into diverging light through the concave lens $2_1$ passes through the etalon 1 and enters a focusing lens $3_1$ placed on the exit side of the etalon 1 in such a manner that the optical axis of the focusing lens $3_1$ is perpendicular to the etalon 1. The divergence angle of the reference light is narrowed down to a certain extent by the focusing lens $3_1$, and fringes of the reference light are formed on the back focal plane of the focusing lens $3_1$. Similarly, the light under wavelength measurement converted into diverging light through the concave lens $2_2$ passes through an area of the etalon 1 different from an area through which the reference light passes. Then, the light under wavelength measurement enters a focusing lens $3_2$ placed on the exit side of the etalon 1 in such a manner that the optical axis of the focusing lens $3_2$ is perpendicular to the etalon 1. The divergence angle of the light under wavelength measurement is narrowed down to a certain extent by the focusing lens $3_2$, and fringes of the light under wavelength measurement are formed on the back focal plane of the focusing lens $3_2$. The two focusing lenses $3_1$ and $3_2$ are placed so that the back focal plane of the focusing lens $3_1$ and that of the focusing lens $3_2$ are coincident with a plane P and that the light beams narrowed down by the two focusing lenses $3_1$ and $3_2$ are partially superimposed on one another in the plane P. A CCD 4 as a single one-dimensional array optical sensor is placed in the plane P in such a manner that the, one-dimensional array of the CCD 4 extends in the vertical direction in the figure, so as to cover at least a part of the superimposing area.

A fringe position signal from the CCD 4 is input to signal processing-display circuit 7 in which it is processed to obtain a wavelength control signal 8. The wavelength control signal 8 is input to the ArF excimer laser 20 and used to control the angle of a diffraction grating, for example, in a spectral width-narrowing optical system provided in the ArF excimer laser 20.

Each reflecting mirror of the etalon 1 in a region on which reference light is incident through the concave lens 2₁ is provided with a dielectric multilayer coating designed to reflect the reference light (He—Ne laser light) with a low loss of light. Each reflecting mirror of the etalon 1 in a region on which light under wavelength measurement (ArF excimer laser light) is incident through the concave lens 22 is provided with another dielectric multilayer coating designed to reflect the light under wavelength measurement with a low loss of light.

Figure 2:
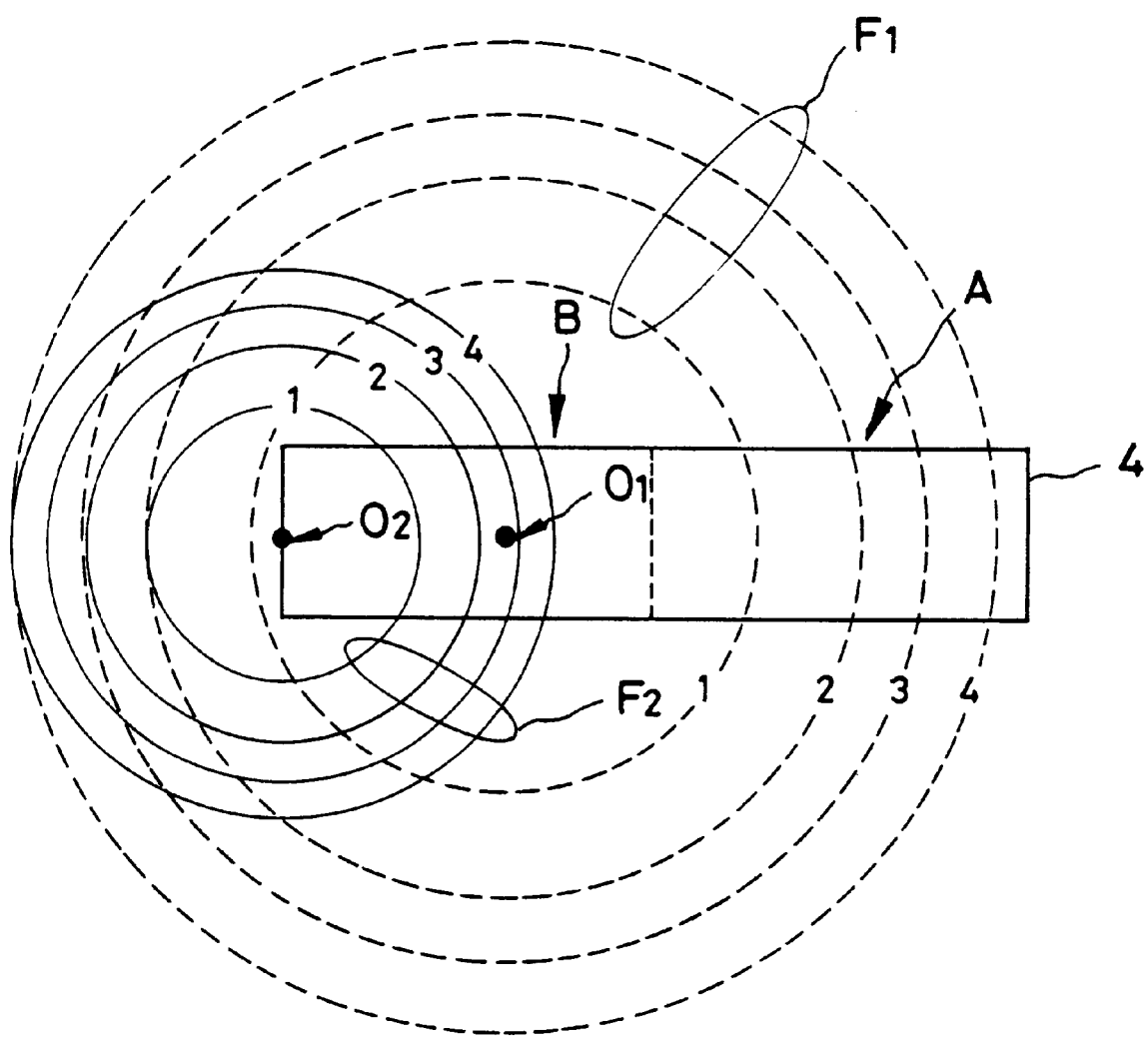
FIG. 2 is a diagram showing an example of formation of fringes when a fringe-forming beam of reference light incident on a one-dimensional array optical sensor and a fringe-forming beam of light under wavelength measurement incident on the one-dimensional array optical sensor are partially superimposed on one another.

In this embodiment, the fringe-forming beam of the reference light and the fringe-forming beam of the light under wavelength measurement are simultaneously incident on the CCD 4 so as to be partially superimposed on one another on the CCD 4. An example of the way in which the two light beams are partially superimposed on one another is shown in FIG. 2. As shown in the figure, the two light beams overlap each other on the CCD 4. In this case, however, the system has been adjusted so that the centers $O_1$ and $O_2$ of the two light beams (coincident with the respective optical axes of the focusing lenses $3_1$ and $3_2$) are displaced relative to each other in the direction of the one-dimensional array of the CCD 4 in the plane P and that fringes $F_1$ of the reference light formed around the enter $O_1$ and fringes $F_2$ of the light under wavelength measurement formed around the center $O_2$ are incident on respective split areas A and B of the CCD 4. Therefore, the wavelength of the light under measurement can be measured with high accuracy on the basis of the wavelength of the reference light simultaneously with the measurement of the reference light by measuring the fringe spacings of the fringes $F_1$ and $F_2$ with a single CCD 4. An example of the measuring procedure will be described below. It should be noted that orders counted from each of the centers $O_1$ and $O_2$ of the fringes $F_1$ and $F_2$ are defined as first order, second order, third order and so forth.

(1) It is assumed that the distance (catalog value: starting value) between the reflecting mirrors of the etalon 1 is d; the wavelength of the reference light is $\lambda_1$; the refractive index of air for the reference light is $n_1$; and the focal length of the focusing lens $3_1$ for forming the fringes $F_1$ of the reference light is $f_1$.

(2) To determine an integer for determining an optical path difference relating to the first-order fringe of the fringes $F_1$ of the reference light, $\theta_s$ is set equal to zero in the following equation expressing the interference conditions of the etalon 1 to obtain $m_s$:

$$m_s \lambda_1 = 2n_1 d \cos \theta_s \quad (a)$$

An integer close to and not larger than $m_s$ obtained is determined, and the integer is denoted by $M_s$.

(3) From equation (a), incident angles $\theta_{s1}$ and $\theta_{s2}$ relating to the first- and second-order fringes of the fringes $F_1$ of the reference light are expressed as follows:

$$\theta_{s1} = \cos^{-1}(M_s \lambda_1 / 2n_1 d)$$

$$\theta_{s2} = \cos^{-1}\{(M_s - 1)\lambda_1 / 2n_1 d\}$$

(4) When the positions of the first- and second-order fringes of the fringes $F_1$ on the CCD 4 are denoted by $X_{s1}$ and $X_{s2}$, the following should hold:

$$X_{s2} - X_{s1} = \Delta X_s = f_1 (\tan \theta_{s2} - \tan \theta_{s1})$$

$$= f_1 [\tan(\cos^{-1}\{(M_s - 1)\lambda_1 / 2n_1 d\}) - \tan\{\cos^{-1}(M_s \lambda_1 / 2n_1 d)\}]$$

(5) The difference $\Delta X_s'$ between the actual positions of the first- and second-order fringes of the fringes $F_1$ of the reference light on the CCD 4 is measured (see FIG. 2).

(6) The difference $(\Delta X_s' - \Delta X_s)$ between the measured value $\Delta X_s$ and the calculated value $\Delta X_s$ is calculated.

(7) With the value of the spacing d between the reflecting mirrors of the etalon 1 changed by $\lambda_1/20$, for example, at a time, the above-described steps (3) to (6) are repeated until the difference $(\Delta X_s' - \Delta X_s)$ reaches a minimum.

(8) The value d finally obtained at step (7) is determined to be d'.

(9) $|d - d'|$ is calculated.

(10) When $|d - d'| \leq \lambda_1 / 10$, for example, the spacing between the reflecting mirrors of the etalon 1 is determined to be d'.

(11) When $|d - d'| > \lambda_1 / 10$, $M_s$ is decremented by 1 ($M_s - 1$) to determine a new $M_s$. Then, the steps (3) to (9) are repeated.

(12) It is assumed that the wavelength of the light under wavelength measurement is $\lambda_2$; the refractive index of air for the light under wavelength measurement is $n_2$; and the focal length of the focusing lens $3_2$ for forming the fringes $F_2$ of the light under wavelength measurement is $f_2$.

(13) To determine an integer for determining an optical path difference relating to the first-order fringe of the fringes $F_{22}$ of the light under wavelength measurement, $\theta$ is set equal to zero in the following equation expressing the interference conditions of the etalon 1 to obtain m:

$$m\lambda_2 = 2n_2 d' \cos \theta \quad (b)$$

An integer close to and not larger than m obtained is determined, and the integer is denoted by M.

(14) From equation (b), incident angles $\theta_1$, and $\theta_2$ relating to the first- and second-order fringes of the fringes $F_2$ of the light under wavelength measurement are expressed as follows:

$$\theta_1 = \cos^{-1}(M\lambda_2 / 2n_2 d')$$

$$\theta = \cos^{-1}\{(M-1)\lambda_2 / 2n_2 d'\}$$

(15) When the positions of the first- and second-order fringes of the fringes $F_2$ on the CCD 4 are denoted by $X_1$ and $X_2$, the following should hold:

$$X_2 - X_1 = \Delta X = f_2 (\tan \theta_2 - \tan \theta_1)$$

$$= f_2 [\tan(\cos^{-1}\{(M-1)\lambda_2 / 2n_2 d'\}) - \tan\{\cos^{-1}(M\lambda_2 / 2n_2 d')\}]$$

(16) The difference $\Delta X'$ between the actual positions of the first- and second-order fringes of the fringes $F_2$ of the light under wavelength measurement on the CCD 4 is measured (see FIG. 2).

(17) The difference $(\Delta X' - \Delta X)$ between the measured value $\Delta X'$ and the calculated value $\Delta X$ is calculated.

(18) With the wavelength $\lambda_2$ changed by 0.05 pm, for example, at a time, the above-described steps (14) to

(17) are repeated until the difference (ΔX'−ΔX) reaches a minimum. The wavelength $\lambda_2$ obtained as a consequence of the procedure is determined to be the measured wavelength.

Figure 3:
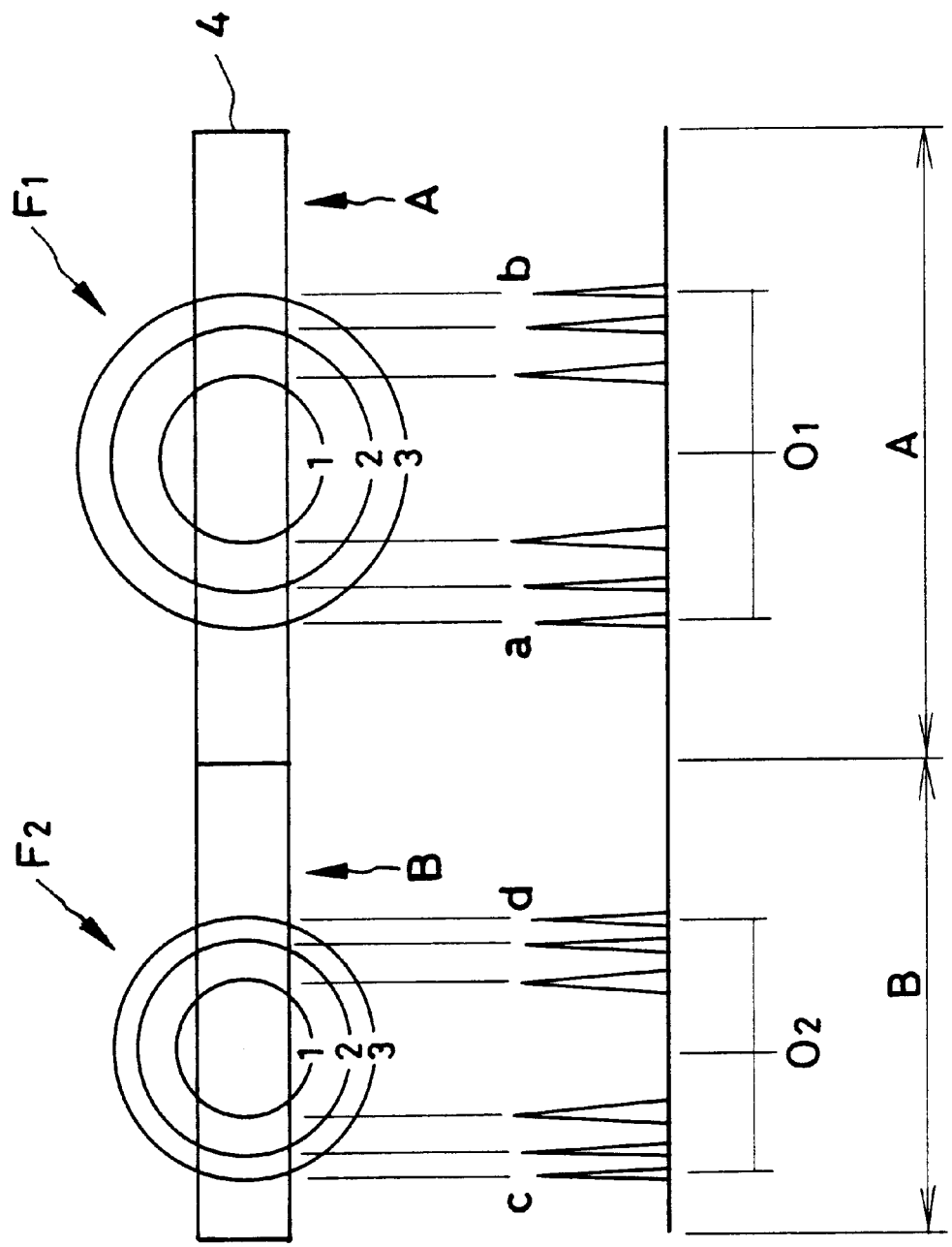
FIG. 3 is a diagram showing an example of formation of fringes when a fringe-forming beam of reference light and a fringe-forming beam of light under wavelength measurement are incident on different areas of a one-dimensional array optical sensor.
Figure 4:
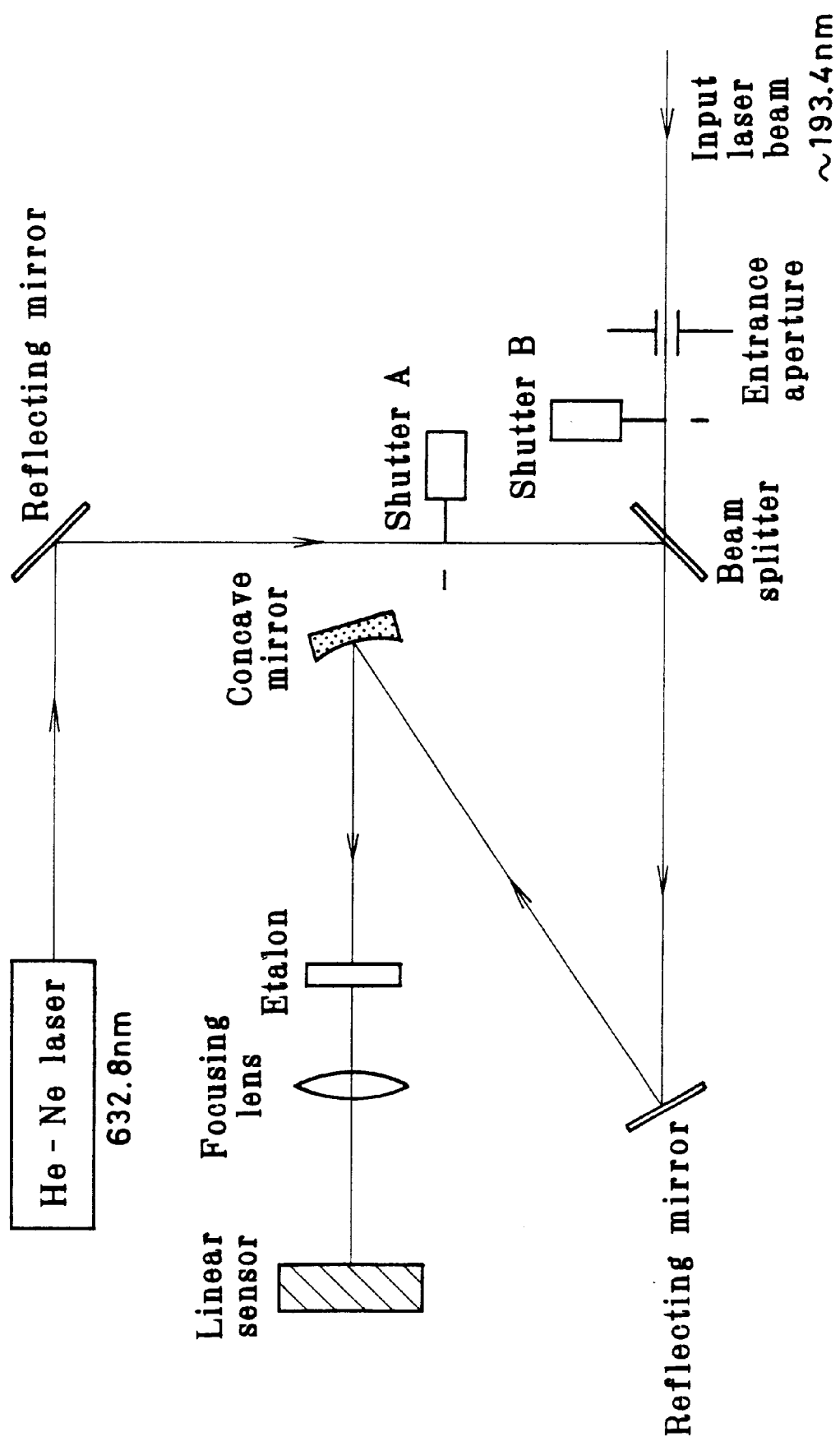
FIG. 4 is a diagram showing the arrangement of an example of conventional wavelength monitoring apparatus.

Incidentally, the arrangement shown in FIG. 1 may be modified so that, as shown in FIG. 3, a beam of reference light that forms the fringes $F_1$ and a beam of light under wavelength measurement that forms the fringes $F_2$ are incident on different areas A and B of the CCD 4. In this case, the distance between the positions of the endmost fringes (a-b and c-d) in each of the areas A and B is obtained, and the positions of the midpoints of the line segments a-b and c-d are obtained as the centers $O_1$, and $O_2$ of the fringes $F_1$ and $F_2$. The position of one fringe closest to each of the centers $O_1$ and $O_2$ is recognized as the first-order fringe, and the position of a fringe outside the first-order fringe is recognized as the second-order fringe. The spacing between the two fringes is measured to determine the above-described values $\Delta X_s'$ and $\Delta X'$.

Thus, according to the present invention, reference light and light under wavelength measurement are made incident simultaneously on different areas of a single common etalon 1, and the wavelength of the light under measurement is measured on the basis of the wavelength of the reference light. Therefore, it is possible to measure the wavelength of the light under measurement with high accuracy simultaneously with the measurement of the reference light. Accordingly, it is possible: to eliminate the influence of a measurement error otherwise introduced owing to a time lag between the measurements when the wavelength of excimer laser light is measured after the etalon has been calibrated by He—Ne laser light as in the prior art.

In addition, when a single one-dimensional array optical sensor (CCD) 4 is used, the positions of the fringes of the reference light and the light under wavelength measurement can be measured without superimposing them on one another by the arrangements as shown in FIGS. 2 and 3. Therefore, the measurement of wavelength can be performed with high accuracy without the need to provide a shutter mechanism for switching between He—Ne laser light and excimer laser light as in the prior art.

In addition, it is only necessary to divide each coating area of a single etalon 1 into two regions and to apply a coating for reference light (He—Ne laser light) to one region and a coating for light under wavelength measurement (ArF excimer laser light) to the other region. Thus, the coating need not to be adapted to two wavelengths as in the prior art, but it is only necessary to apply a reflective coating for a single wavelength to each of the two regions. Accordingly, it is possible to obtain satisfactory reflectance and low-loss characteristics for each wavelength.

Although in the foregoing embodiment a beam of reference light and a beam of light under wavelength measurement are incident on a single CCD 4 in such a manner that at least a part of the former light beam and a part of the latter light beam are superimposed on one another, it is also possible to use two 1-dimensional array optical sensors for the reference light and the light under wavelength measurement, respectively. The optical systems for making the reference light and the light under wavelength measurement incident on the etalon 1 are not necessarily limited to concave lenses that produce diverging light but may be optical systems that produce converging light, e.g. convex lenses, or optical systems that produce diffused light, e.g. ground glass.

Although the wavelength monitoring apparatus for laser light for semiconductor exposure according to the present invention has been described above by way of embodiments, it should be noted that the present invention is not limited to the foregoing embodiments but can be modified in a variety of ways. In particular, the present invention is applicable to not only ArF excimer laser light but also fluorine laser light.

As will be clear from the foregoing description, in the wavelength monitoring apparatus for laser light for semiconductor exposure according to the present invention, laser light for semiconductor exposure and reference light are made incident on different areas of a single etalon in such a manner that the respective center axes of the laser light and the reference light are displaced relative to each other. The laser light and reference light passing through the etalon are passed through two focusing optical systems, respectively, to produce interference fringes on a one-dimensional array optical sensor. Accordingly, it is possible to measure the wavelength of the light under measurement with high accuracy on the basis of the wavelength of the reference light simultaneously with the measurement of the reference light. Thus, it is possible to eliminate the influence of a measurement error otherwise introduced owing to a time lag between the measurement of the reference light and the measurement of the light under wavelength measurement. In addition, it is only necessary to divide each coating area of a single etalon into two regions and to apply a coating for the reference light to one region and a coating for the light under wavelength measurement to the other region. Accordingly, it becomes easy to apply reflective coatings to the etalon.

What we claim is:

1. A wavelength monitoring apparatus for laser light for semiconductor exposure, comprising:

an entrance-side optical system for making the laser light for semiconductor exposure and reference light incident on different areas of a single etalon in a form of diverging light, converging light or diffused light in such a manner that respective center axes of the laser light and the reference light are displaced relative to each other;

two focusing optical systems provided in approximately coaxial relation to the respective center axes of said laser light and reference light passing through said etalon; and a one-dimensional array optical sensor placed in a plane coincident with back focal planes of said focusing optical systems to receive interference fringes produced by said laser light and reference light;

wherein positions of the interference fringes on said one-dimensional array optical sensor are detected to calculate a wavelength of said laser light for semiconductor exposure.

2. A wavelength monitoring apparatus according to claim 1, wherein said one-dimensional array optical sensor is a single one-dimensional array optical sensor, and the interference fringes produced by said laser light for semiconductor exposure and the interference fringes by said reference light are incident on respective split areas of said one-dimensional array optical sensor without being superimposed on one another.

3. A wavelength monitoring apparatus according to claim 1, wherein said etalon has different reflective coatings applied to an area thereof on which said laser light for semiconductor exposure is incident and an area thereof on which said reference light is incident, respectively.

4. A wavelength monitoring apparatus according to claim 2, wherein said etalon has different reflective coatings applied to an area thereof on which said laser light for semiconductor exposure is incident and an area thereof on which said reference light is incident, respectively.

5. A wavelength monitoring apparatus according to claim 1, wherein said laser light for semiconductor exposure is ArF excimer laser light or fluorine laser light, and said reference light is He—Ne laser light.

* * * * *